(12) United States Patent
Souissi

(10) Patent No.: US 8,730,914 B2
(45) Date of Patent: May 20, 2014

(54) SYSTEMS AND METHODS FOR AN INTELLIGENT MOBILE MEDIA SERVER

(75) Inventor: Slim Souissi, San Diego, CA (US)

(73) Assignee: Novatel Wireless, Inc., San Diego, CA (US)

(*) Notice: Subject to any disclaimer, the term of this patent is extended or adjusted under 35 U.S.C. 154(b) by 330 days.

(21) Appl. No.: 13/110,872

(22) Filed: May 18, 2011

(65) Prior Publication Data

US 2011/0286428 A1 Nov. 24, 2011

Related U.S. Application Data

(60) Provisional application No. 61/345,887, filed on May 18, 2010.

(51) Int. Cl.
*H04W 4/00* (2009.01)
*H04W 36/00* (2009.01)
*H04W 40/36* (2009.01)

(52) U.S. Cl.
CPC .................................. *H04W 40/36* (2013.01)
USPC ........................................ 370/331; 455/436

(58) Field of Classification Search
USPC ......................................................... 370/331
See application file for complete search history.

(56) References Cited

U.S. PATENT DOCUMENTS

| 2004/0179512 | A1 | 9/2004 | Leblanc et al. |
| 2006/0172769 | A1* | 8/2006 | Oh .............................. 455/557 |
| 2007/0217436 | A1* | 9/2007 | Markley et al. ............... 370/401 |
| 2008/0146245 | A1* | 6/2008 | Appaji ....................... 455/456.1 |
| 2010/0008293 | A1 | 1/2010 | Gupta et al. |

OTHER PUBLICATIONS

International Search Report and Written Opinion for PCT/US2011/037059 mailed Feb. 8, 2012 (8 pages).

* cited by examiner

*Primary Examiner* — Shaq Taha
(74) *Attorney, Agent, or Firm* — Procopio, Cory, Hargreaves & Savitch LLP; Noel C. Gillespie

(57) ABSTRACT

An Intelligent Mobile HotSpot (IMHS) comprises a local area network radio interface; an in home display interface; a user interface comprising one of a switch, button, or input (collectively an input); non-transitory memory configured to store instructions; and a processor coupled with memory, the instructions configured to cause the processor to perform the following in response to an activation of the input: automatically establish a data connection with a vehicle display over the local area network, or automatically establish a data connection with a television over the in home display interface, and automatically cause a landing page to be displayed on the in vehicle display or the television.

19 Claims, 12 Drawing Sheets

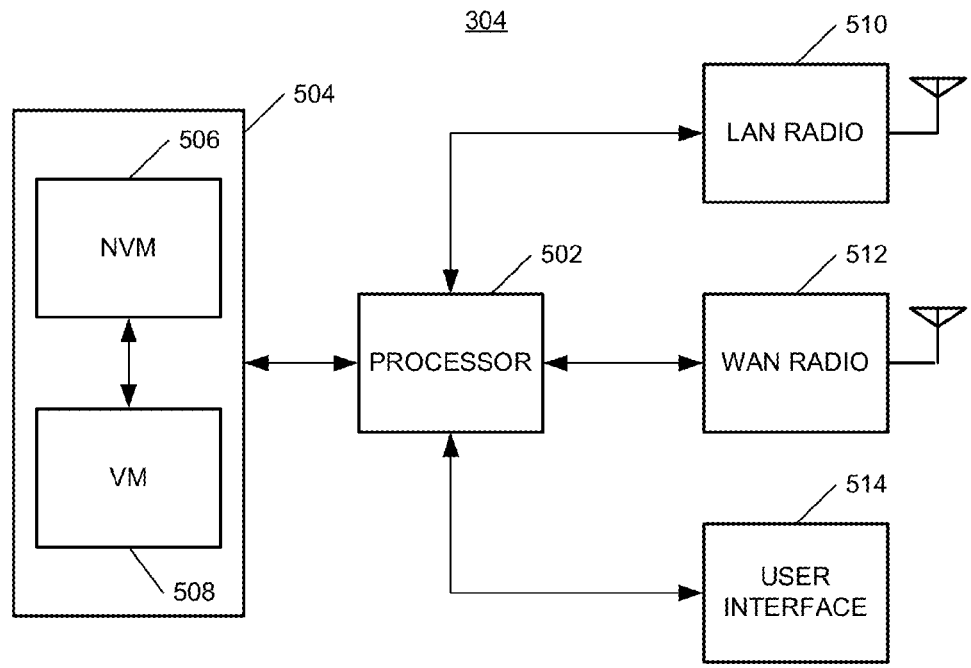
FIG. 5
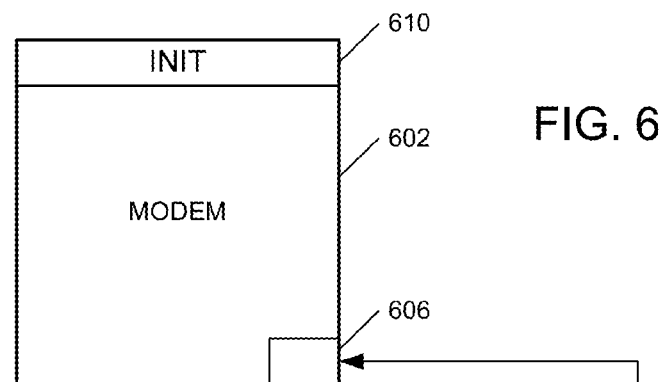
FIG. 6
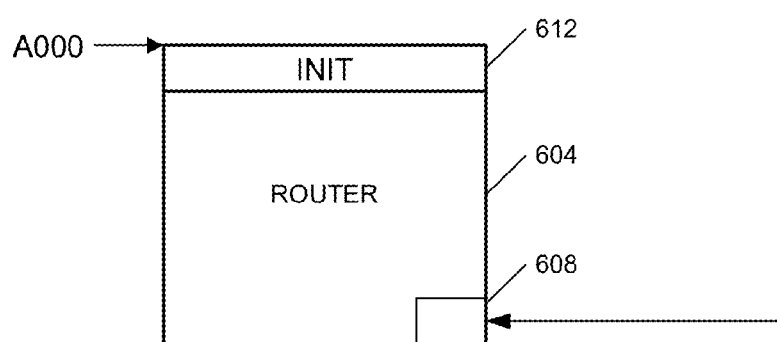

SYSTEMS AND METHODS FOR AN INTELLIGENT MOBILE MEDIA SERVER

RELATED APPLICATIONS INFORMATION

This application claims the benefit under 35 U.S.C. §119(e) of U.S. Provisional Application Ser. No. 61/345,887, filed May 18, 2010, and entitled "Mobile Intelligent Media Server that Seamlessly Connects TV," which is incorporated herein by reference in its entirety as if set forth in full.

This application is also related to U.S. patent application Ser. No. 12/537,970. filed Aug. 7, 2009, and entitled Systems and Methods for Automatic Connection with a Wireless Network," which claims priority to U.S. Provisional Patent Application Ser. No. 61/178,926, filed May 17, 2009 and entitled "Rule Based Internet Browser Redirect for Wireless WAN Routers," and both of which are incorporated herein by reference in its entirety as if set forth in full.

BACKGROUND

1. Technical Field

The embodiments described herein generally relate to wireless communication and more particularly to automatic connection with a wireless Wide Area Network (WAN) through a mobile, wireless Intelligent Mobile HotSpot (IMHS).

2. Related Art

Wireless modems exist that can be inserted, or otherwise interfaced with a computer and that enable data communication over a wireless Wide Area Network (WAN) such as a cellular type network. Early versions of these cards had connectors that complied with the PCMCIA standard and that were inserted into a slot in the side of the computer. Newer versions have USB connectors for interfacing with the computer. Such modems allow access to the Internet, or World Wide Web (WWW), even where no wired network connection exists and are most often interfaced with a laptop or other portable computing device.

FIG. 1 illustrates a conventional system 100 in which a data connection can be established over a wide area network using a conventional wireless modem 104. In FIG. 1, modem 104 is interfaced, e.g., via a PCMCIA slot or USB connection, with a computing device 106 via connection 110. Modem 104 can then establish a data connection between base station 102, associated with, e.g., a cellular type network, and computer 106. Modem 104 and base station 102 can communicate via wireless signals 108.

FIG. 2 is a flow chart illustrating a conventional process by which such a data connection can be established. First, in step 202, a user of computing device 106 inserts, or connects modem 104 with computer 106. In step 204, modem 104 is then tethered to computing device 106. Once modem 104 is tethered to computing device 106, a connection manager running on computing device 106 can be launched in step 206. The connection manager will often display whether the network, i.e., the WAN, is available. If it is, then in step 208 the user can select the network, which will cause a Point-to-Point Protocol (PPP) connection to be established between base station 102 and computer 106 via modem 104 in step 210.

In networking, the PPP is a data link protocol commonly used to establish a direct connection between two networking nodes. It can provide connection authentication, transmission encryption privacy, and compression. PPP is used over many types of physical networks including serial cable, phone line, trunk line, cellular telephone, specialized radio links, and fiber optic links such as SONET. For example, most Internet service providers (ISPs) use PPP for customer dial-up access to the Internet. PPP is commonly used as a data link layer protocol for connection over synchronous and asynchronous circuits, where it has largely superseded the older, non-standard Serial Line Internet Protocol (SLIP) and Telephone Company mandated standards, such as Link Access Protocol, Balanced (LAPB) in the X.25 protocol suite. PPP is designed to work with numerous network layer protocols, including Internet Protocol (IP), Novell's Internetwork Packet Exchange (IPX), NBF, and AppleTalk.

One draw back to system 100 of FIG. 1 is that only a single computing device 106 can be interfaced with base station 102 via modem 104. This is because modem 104 is tethered to computing device 106.

SUMMARY

An Intelligent Mobile HotSpot (IMHS) that can automatically display a landing page on an in-home or in-vehicle display that can be used to access content is disclosed herein.

According to one aspect, an Intelligent Mobile HotSpot (IMHS) comprises a local area network radio interface; an in home display interface; a user interface comprising one of a switch, button, or input (collectively an input); non-transitory memory configured to store instructions; and a processor coupled with memory, the instructions configured to cause the processor to perform the following in response to an activation of the input: automatically establish a data connection with a vehicle display over the local area network, or automatically establish a data connection with a television over the in home display interface, and automatically cause a landing page to be displayed on the in vehicle display or the television.

These and other features, aspects, and embodiments are described below in the section entitled "Detailed Description."

BRIEF DESCRIPTION OF THE DRAWINGS

Features, aspects, and embodiments are described in conjunction with the attached drawings, in which:

FIG. 5 is a diagram illustrating example components that can be included in an IMHS included in the system of FIG. 3 in accordance with one embodiment;

FIG. 6 is a diagram illustrating modem and router instructions that can be loaded into volatile memory in the IMHS of FIG. 5 in accordance with one embodiment;

DETAILED DESCRIPTION

In the embodiments below, an IMHS is used to interface a plurality of computing device or LAN client devices with a wireless WAN. For example, the WAN can be configured to implement one of the Third Generation (3G) protocols, such as EDGE, CDMA2000, or the Universal Mobile Telecommunications System (UMTS) protocols, High Speed Packet Access (HSPA) or HSPA+ protocols, Long Term Evolution (LTE) protocols, Evolution Data Optimization (EV-DO) rev. A (DOrA), WiMAX, or other newer 4G protocols. The computing devices interface with the IMHS over a wireless Local Area Network (LAN) such as a WiFi network, wireless USB network, ultrawideband network, or a Zigbee network; however, it will be understood that the descriptions that follow are not intended to limit the embodiments herein to particular standards or architectures, the embodiments being provide by way of example only.

Figure 1:
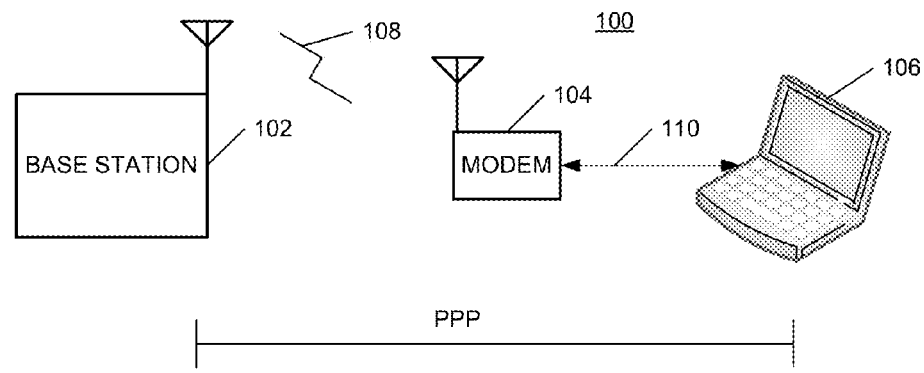
FIG. 1 is a diagram illustrating a conventional system for using a wireless modem to access a WAN.
Figure 2:
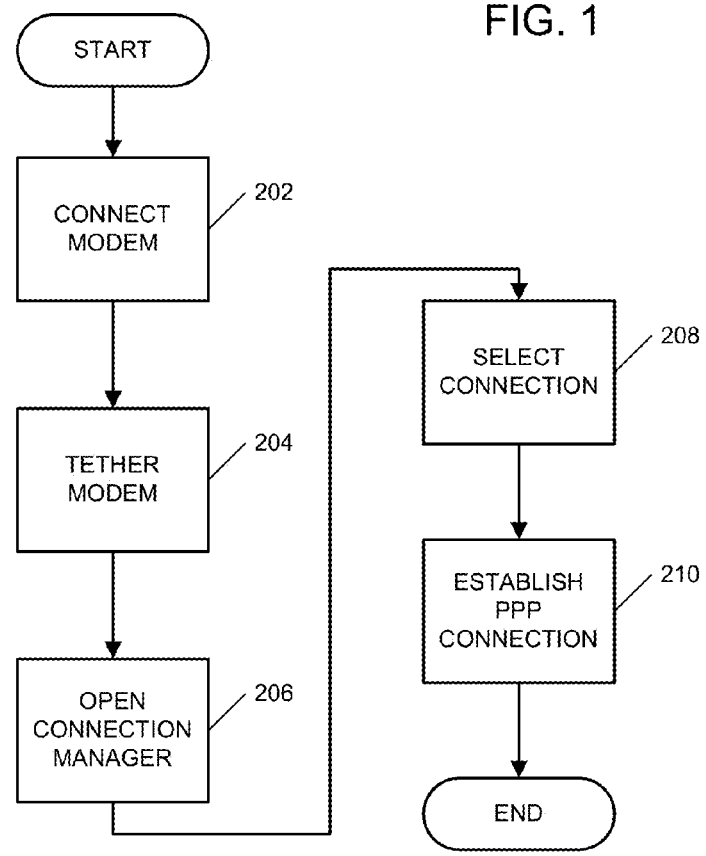
FIG. 2 is a flow chart illustrating a conventional process for establishing a data connection using a modem included in the system of FIG. 1.
Figure 3:
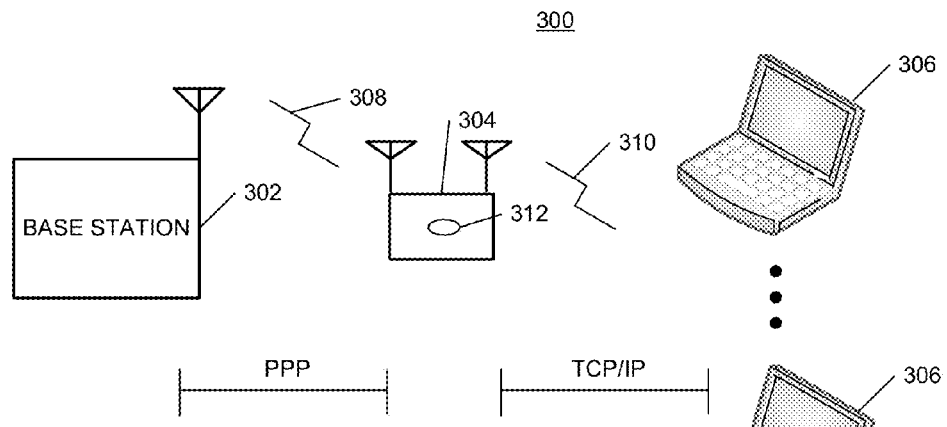
FIG. 3 is a diagram illustrating an example system for using an IMHS to access a WAN in accordance with one embodiment.

FIG. 3 is a diagram illustrating an example system 300 for using an IMHS to access a WAN in accordance with one embodiment. Central to system 300 is IMHS 304. While not illustrated in detail in FIG. 3, IMHS 304 can comprise two radio communication interfaces: one for communicating with a base station 302 associated with a WAN, and one for communicating with a plurality of computing or wireless LAN client devices 306 via a wireless LAN. Thus, IMHS 304 can communicate with base station 302 via wireless signals 208 and with devices 306 via wireless signals 310, where signals 308 and 310 implement different protocols associated with the related network.

Figure 4:
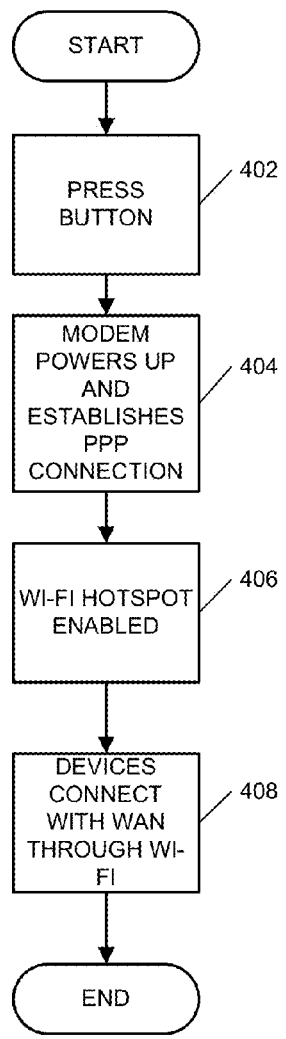
FIG. 4 is a flow chart illustrating an example process for establishing a data connection using an IMHS included in the system of FIG. 3 in accordance with one embodiment.

In certain embodiments, IMHS 304 can, e.g., be configured to interface as many as five (5) computing devices 306 with base station 302. FIG. 4 is a flow chart illustrating an example process by which devices 306 can be interfaced with base station 302. As can be seen in FIG. 3, IMHS 304 can comprise a single power button, or switch 312, when a user presses button 312 to power on IMHS 304, in step 402, then IMHS 304 will power up and automatically establish a data connection, e.g., a PPP connection, with base station 302 in step 404. As illustrated, this PPP connection is between base station 302 and IMHS 304 and not between base station 302 and devices 306. In step 406, IMHS 304 will then enable the LAN. In step 408, devices 306 can automatically connect to the WAN through IMHS 304 and the LAN connections 310. In other words, IMHS 304 can act as a wireless LAN access point for devices 306. Communication between IMHS 304 and devices 306 can be via TCP/IP over WiFi. In certain embodiments, the users of devices 306 must provide a password when accessing the LAN. The password can be printed on device 304 or displayed on device 304.

Thus, all that is required to enable multiple computing devices 306 to access the wireless WAN is to power on IMHS 304, and possibly provide a password. IMHS 304 will automatically establish a connection with the WAN and enable the wireless LAN hotspot in response. There is no tethering of IMHS 304 with devices 306.

FIG. 5 is a diagram illustrating certain components that can be included in IMHS 304 in accordance with one embodiment. It will be understood that additional components can be included in IMHS 304. The example of FIG. 5 is not intended to exhaustively show all components, but rather is provided by way of example to illustrate certain components in relation to the systems and methods described herein. As such, the example of FIG. 5 should not be seen as limiting the systems and methods described herein to a certain design or architecture. Moreover, the components illustrated in FIG. 5 are obviously depicted at a high level. It will be understood that the components can actually be implemented via multiple components such as multiple integrated circuits, discrete device, or both, and can be packaged in a single package or in multiple packages. It will also be understood that IMHS 304 is often battery powered and therefore will comprise a battery (not shown).

Referring to FIG. 5, IMHS 304 can comprise a processor 502 interfaced with memory 504, LAN radio 510, WAN radio 512, and user interface 514. Processor 502 will often comprise several processing cores such as a digital signal processing core, a microprocessing core, math-coprocessors, etc.

Memory 504 can comprise several forms of memory, such as non-volatile memory 506 and volatile memory 508. Non-volatile memory is used to store data and instructions that should be maintained even when power is removed from IMHS 304. Volatile memory is used to store instructions and data for which it is not important whether it is maintain when power is removed. For example, the code used to run IMHS 304 can be stored in non-volatile memory 506 such that it is maintained even when IMHS 304 is turned off and so that IMHS 304 can access this code when it is turned on again; however, the code can be copied to volatile memory 508 when IMHS 304 is on. This can, for example, allow faster access to instructions and data by processor 502.

Examples of non-volatile memory include Read-Only Memory (ROM), flash memory, and most types of magnetic computer storage devices, e.g., hard disks, floppy disks, and magnetic tape and optical discs, although these later devices are not generally used for IMHS 304. Rather, the former, which can be referred to as electrically addressed non-volatile memories are typically used for IMHS 304. Non-volatile memory is typically used for the task of secondary storage, or long-term persistent storage. Most forms of non-volatile memory have limitations that make them unsuitable for use as primary storage. Typically, non-volatile memory either costs more or performs worse than volatile random access memory. Electrically addressed non-volatile memories can include a Programmable ROM (PROM), Erasable PROMs (EPROM), Electrically erasable PROM (EEPROM), Flash memory, or some combination thereof.

Volatile memory, also known as volatile storage or primary storage device, is computer memory that requires power to maintain the stored information, unlike non-volatile memory which does not require a maintained power supply. The most widely used form of primary storage today is a volatile form of random access memory (RAM), meaning that when the computer is shut down, anything contained in RAM is lost. Most forms of modern RAM are volatile storage, including Dynamic Random Access Memory (DRAM) and static random access memory (SRAM). Thus, IMHS 304 can include DRAM, SRAM, or some combination thereof, although IMHS 304 is more likely to include SRAM than DRAM.

In certain embodiments, some portion or even all of non-volatile memory 506, volatile memory 508, or both can be included with processor 502.

LAN radio 510 can comprises all of the hardware required for the radio front end of the wireless LAN interface. Similarly, WAN radio 512 can comprises all of the hardware required for the radio front end of the wireless WAN interface. Processor 502 or components thereof can serve as the processing backend for both radios 510 and 512. Alternatively, separate processing circuitry can be included for each of the LAN function and the WAN function. In such embodiments, the processing functionality described herein can be included in either the LAN processing circuitry or the WAN processing circuitry.

User interface 514 can comprise just button 312. But in other embodiments, it can also comprise a display, e.g., to display a password.

Instructions stored in memory 504 can be used by processor 502 to control the operation of IMHS 502 including control of radios 510 and 512. Thus, the instructions stored in memory 504 should include instructions for controlling the operation of radios 510 and 512 as well as for bridging communications between basestation 320 and devices 306 and for configuring IMHS 304. In certain embodiments, the instructions for controlling WAN radio 512, and the authentication procedures for connecting to the WAN, can be included in standard code associated with WAN radio 512. These instructions can be referred to as modem instructions. Separate instructions for controlling the remaining functions of IMHS 304 can then also be stored in memory 504, including the procedures and settings for controlling LAN radio 510. These instructions can be referred to as router instructions.

FIG. 6 is a diagram illustrating examples blocks of instructions that can be stored in memory 504. For example, the instructions can be stored in non-volatile memory 506 and can, e.g., be copied to volatile memory 508 during operation. As can be seen, the instructions illustrated in FIG. 6 can comprise modem instructions 602 and router instructions 604. Each set of instructions can comprise an initialization routine 610 and 612 respectively, and be associated with a function table 606 and 608 respectively. Router instructions 604 can also be associated with an offset or known address, e.g., A000, at which it should be loaded into volatile memory.

Figure 7:
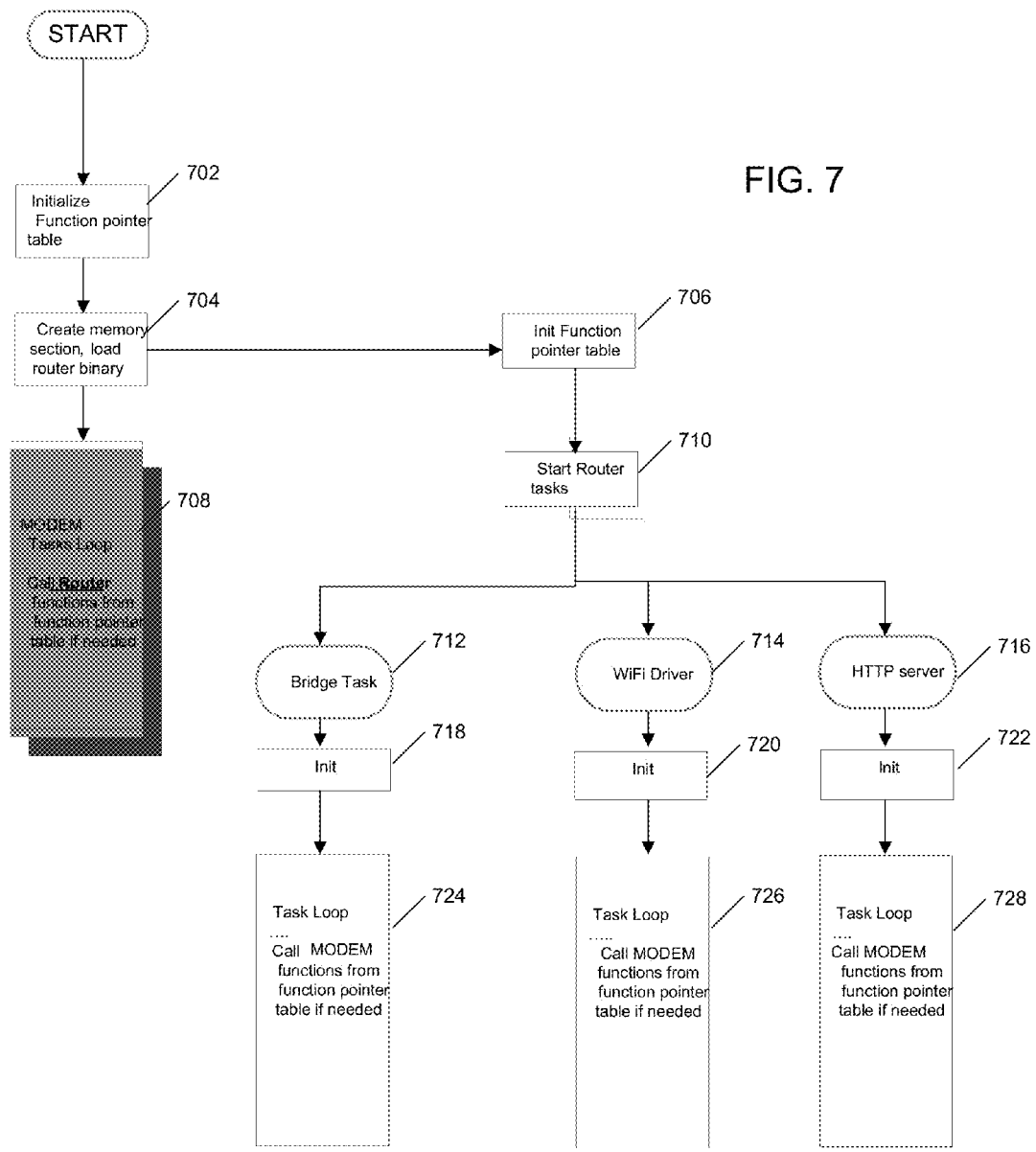
FIG. 7 is a diagram illustrating an example method for loading and initializing the modem and router instructions of FIG. 6 in accordance with one embodiment.

A process for allowing these two sets of instructions to interact must then be implemented in such embodiments. FIG. 7 is a flow chart illustrating an example process for loading modem instructions and router instructions into volatile memory 508 for execution by processor 502 and for configuring the instructions to interact with each other. In step 702, on boot up, e.g., activation of button 312, modem initialization function 610 can generate a modem function pointer table 606, which can be populated with modem functions. In step 704, a block of memory can be reserved in volatile memory 508, e.g., at the known offset address, and router instructions 604 can be loaded into the reserved block in nonvolatile memory 508. Router initialize function 612 can then be called in step 706. Initialization function 612 in the router instructions 604 can then populate function table 608 with router functions. Modem instructions 602 will need to use, or call certain functions included in router instructions 604. Similarly, router instructions 604 will need to call certain functions in modem instructions 602. Accordingly, the initialization functions can cause each set of instructions to exchange pointers to the relevant functions, such that modem function table 606 will include pointers to the relevant functions in router instructions 604 and router function table 608 will include pointers to the relevant functions in modem instructions 602.

Alternatively, a single function table with the appropriate functions and pointers can be created and used by both modem and router instructions 602 and 604; however, it will be understood that how the function tables are described is a matter of convenience and that what is important is that there is an association between functions and pointers to functions in the various instructions that is maintained within IMHS 304.

Initialization function 612 can also be configured to create a set of related tasks, e.g., an http server task, a WiFi driver task, a bridge task, etc. For example, once the functional tables are initializes, the router instructions can start to run in step 708. Different tasks can then be called in steps 712, 714, and 716, which can cause initialization functions related with each tasks to run in steps 718, 720, and 722. These initialization functions can then initialize the related tasks such that they can run in steps 724, 726 and 728.

On successful initialization, router instructions 604 can be configured to notify modem instructions 602 through either a return value or a signal.

Modem instructions 602 can start to run in step 708. As the modem instruction and router tasks run, they can communicate with each other using the set of function pointers populated in the function pointer tables. For example, a typical function that a router task can use is "efs_open" or "rex_sleep." Modem instructions 602 can, for example, call a transmit function in the router WiFi driver or it can call the address translate functions.

Figure 8:
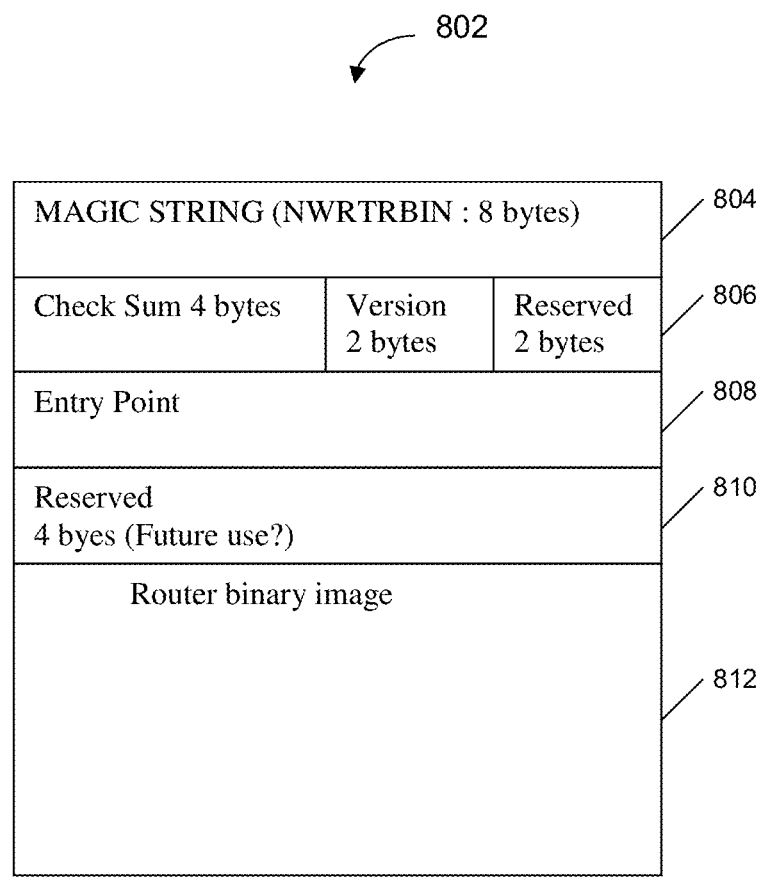
FIG. 8 is a diagram illustrating an example image of the router instructions of FIG. 6 in accordance with one embodiment.

A partition table for memory 504 can for example have one additional, e.g., 3 MB partition for router instructions 604. Router instructions 604 can be built into a binary file from, e.g., an elf file. FIG. 8 is a diagram illustrating an example image 802 of router instructions 604 in accordance with one embodiment. A header can be added to the binary and can include a signature field 804, for the image signature; a checksum field 806, which can, e.g., comprise a 4 byte checksum and a 2 byte version, as well as 2 reserved bytes; and entry point field 808 to hold the address offset; and a 4 byte reserved field 810. Image 802 can then mostly consist of the binary image 812 for instructions 604.

On boot up, the operating system can verify the checksum, version compatibility, and magic string from the image header before proceeding to the next step, e.g., step 702.

Accordingly, router instructions 604 are not statically linked into modem instructions 602. Rather, they will be compiled and linked into a separate binary with a fixed entry point (offset address) specified in the router image header. This binary can then be loaded at that exact location specified by the offset address at run time. The memory location specified by the offset address should specify a block of memory that is not used by the memory instructions. Once the memory section is created, the router binary except the header can then be loaded at the address where the image was created. After the modem instruction initialization is completed, it will call an initialization function located in the router binary. This location will be known to the modem instructions because where the router binary was loaded in the memory will be known. The router initialization function can then populate the rest of the function pointers in the structure described above for the modem instructions. Form this point on the modem and router instructions can communicate with each other using the set of functions that have been saved in the function pointer table.

Once IMHS 304 is powered up, the connection with base station 302 is establish, the LAN is activated, and IMHS 304 will be ready to route data packets from devices 306 to base station 302. Devices 306 can then access, e.g., the Internet through IMHS 304. All that may be required for devices 306 to access the Internet, or more generally the WAN associated with base station 302 is a password, which can be displayed in IMHS 304. Contrast this with system 100 in which only a single device 106 can access the WAN.

Figure 9A:
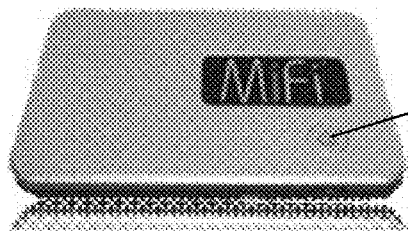
FIGS. 9A-D are diagrams illustrating various example implementations of an IMHS.
Figure 9B:
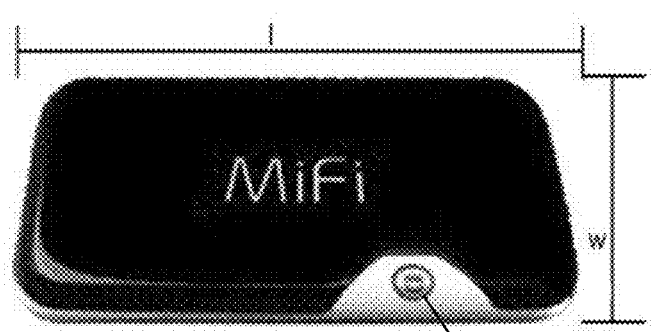
Figure 9C:
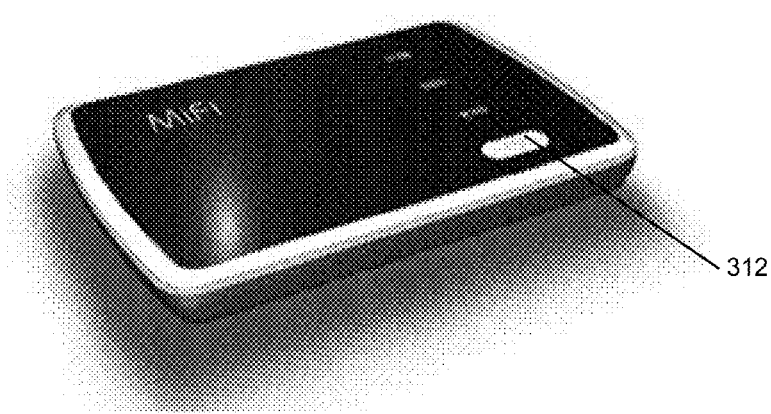
Figure 9D:
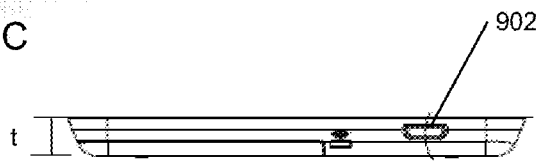

FIGS. 9A-D are diagrams illustrating various example implementations of IMHS 304. As can be seen, each implementation includes a single button 312. Additionally, as illustrated in FIG. 9D, IMHS 304 can include a USB or other data connection 902 for interfacing with IMHS 304. In certain embodiments, IMHS 304 can be approximately credit card sized. In other words, IMHS 304 can comprise a length (l) and width (w) that are very close to those of a credit card. In addition, IMHS 304 can comprise a thickness that is very thin. While it may be thicker than a credit card, the overall dimensions can be such that IMHS can easily fit in a pocket or even a wallet.

The acceptance and availability of new technologies can increase the functionality of an IMHS 304 and enable greater convergence within the home and in the vehicle. For example, the deployment of 4G LTE worldwide and the expansion of WiMAX in the United Stated means that throughput for wireless WANs can exceed fixed lines speeds in many markets, e.g. 5-12 Mbps. Further, the cost per byte relative to 3G will go down significantly and 4G devices will be increasingly affordable for the average consumer. The availability of new smart phone operating systems that provide free and open access and access to an established application development community will also increase the availability of applications that can take advantage of these new, faster networks.

In addition, the availability of small, cost effective, low power, media processors for portable devices that can provide processing speeds of greater than 1 GHZ and are this more than adequate for mobile environments increase the types of power of media applications that can be included in smaller portable devices. Examples include the Qualcomm SnapDragon, TI OMAP, Intel Atom, and others. Further, new compression technology is enabling the business case for mobile Video downloads.

As a result, 4G modems can compete more effectively against DSL & cable lines for fixed access within the home and vehicle and enable convergence between fixed and mobile access that overcomes the issues that have prevented successful integration in the past. Wireless Broadband will take market share from fixed broadband, but as explained below and IMHS can allow mobility to complement fixed access and provide a unique combined value proposition where portability of the user experience is key.

Accordingly, in certain embodiments, an IHMS such as described above can serve as a media server that can, for example, connect with a television or other in home display. Such an IMHS can include such hardware and software as a graphics processor, web server, media gateway, applications layer, etc. The IMHS can then be configured to interface with, e.g., a television and allow users to access content through the IMHS and display the content on the television. This is illustrated in the examples of FIGS. 10A and 10B.

Figure 10A:
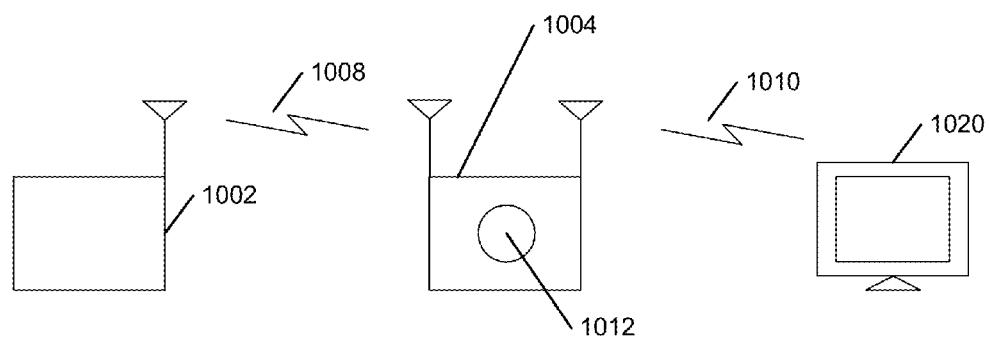
FIGS. 10A and 10B are diagrams illustrating an example router configured to act as a media server in accordance with one embodiment.
Figure 10B:
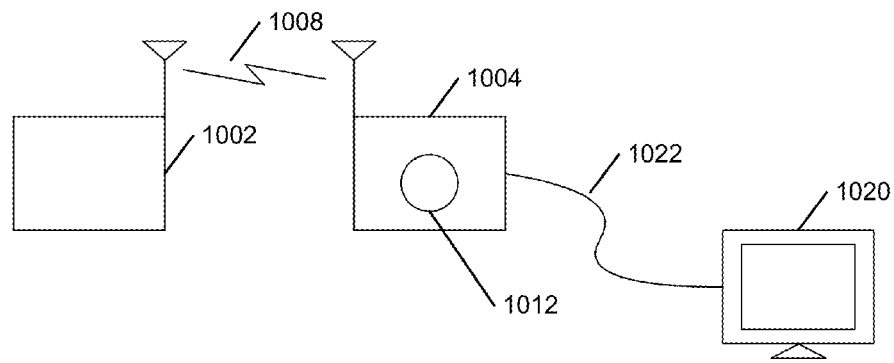

In FIG. 10A, IHMS 1004 in wirelessly interfaced with television 1020. In FIG. 10B, IMHS 1004 is connected with television 1020 via a wire. The connection between IMHS 1004 and television 1020 can be accomplished via Infra red, WiFi, WAN, Wireless HDMI, UWB, a cable or other means of wireless communication. Cable 1022 can, for example, be a HDMI cable, USB cable, or other cable capable of carrying information including audio and visual information. Thus, IMHS 1004 can include a cable connection port or interface configured to connect with cable 1022. An example of such an interface is illustrated in FIG. 9D.

IMHS 1004 can then be wireless connected via radio signals 1008 with a base station or router 1002. Base station or router 1002 can be part of the wireless WAN or part of a local Area Network (LAN), e.g., within the home, or both, depending on the embodiment.

Figure 11:
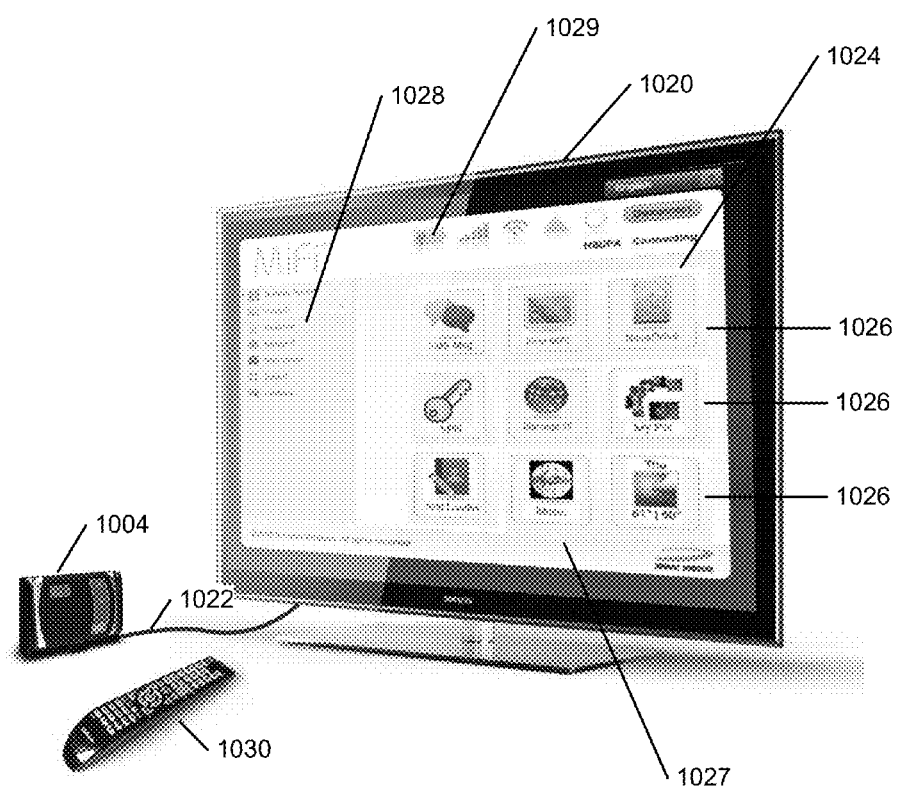
FIG. 11 is a diagram illustrating the router of FIG. 10B automatically displaying a landing page in an in-home display.

Once connected, IMHS 1004 can be configured to project a landing page on television 1020 as illustrated in FIG. 11. In this example, IMHS 1004 is connected via a wire 1022 to, e.g., the television HDMI port. Once connected, landing page 1024 can be displayed. Page 1024 can comprise a status bar 1029 and a navigation pane 1028. Page 1024 can also comprise an area 1027 that displays a plurality of content or applications 1026 that can be access via the landing page 1024 and IMHS 1004.

A user can access carrier specific content or applications 1026, or other content, including visual voice mail and SMS messages; pictures in a photo album; music, content stored in a NovaDrive™ or carrier cloud storage; download Vcast video clips; download new carrier or other applications; access home content from, e.g., any home PC, Blueray, Netgear storage Vault, DLNA server, cloud content, e.g., from cable/DSL/FIOS, Netflix account; download movies and content for use while mobile; access Kodak gallery; etc. It will be recognized that the above are by way of example only.

IHMS 1004 can be configured such that a user must only press button 1012 in order to establish the required connectivity and automatically display the landing page 1024. In certain embodiments, a user can then navigate throughout the landing page 1024 and access media widgets 1026 with a standard remote control 1030. Thus, landing page 1024 can comprise a widget, application (app), or the like associated with various content. The user can then access the content by simply activating the app. Such apps or widgets can, e.g., include a Netflix widget to watch movies; a Pandora widget to listen to radio music; a Kodak widget to view a photo gallery; a Cloud/local storage widget to access pre-stored, e.g., DLNA content; a Carrier CommCenter widget to check visual voice mail and SMS; a Carrier media widget for music, photos, movies, books; etc. In fact as explained in more detail below, numerous peripheral devices can be replaced by widgets or apps that can be accessed via the landing page 1024.

Figure 12:
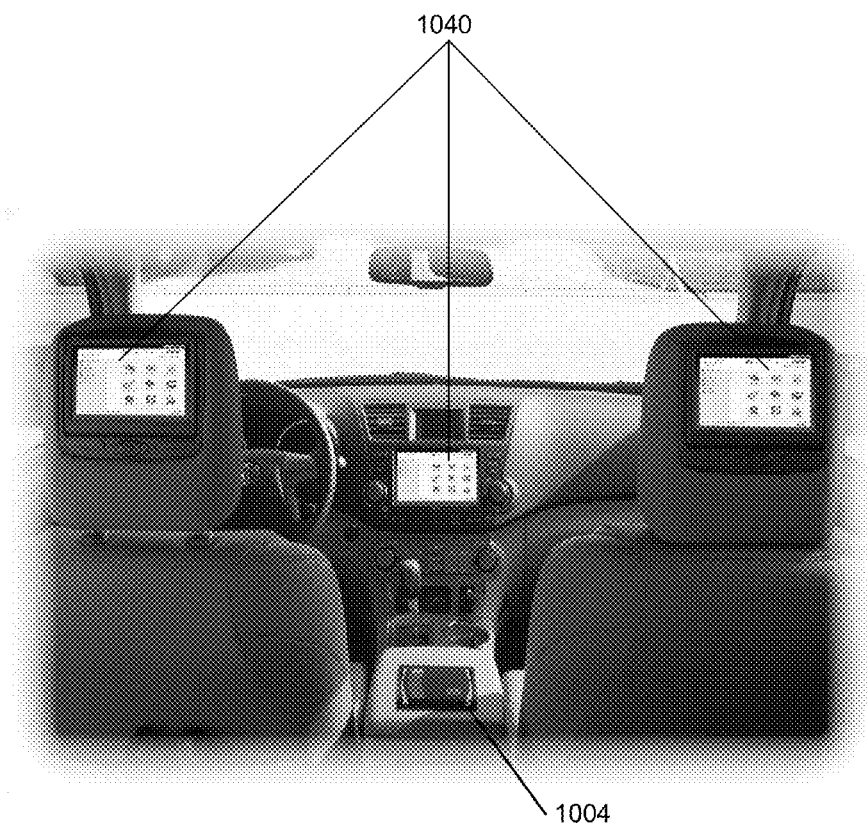
FIG. 12 is a illustrating a router automatically displaying a landing page on an in-vehicle display.

In other embodiments, a IMHS can similarly interface with displays within a vehicle as illustrated in FIG. 12. As can be seen, the IMHS 1004 can be placed within the vehicle and can interface with displays 1040 via, e.g., a WLAN connection such as a WiFi connection. The WiFi connection can for example be a WiFi 802.11n connection. A landing page 1024 can then be displayed on one or more of displays 1024. Displays 1040 can comprise touch screen technology to allow navigation of landing page 1024.

In certain embodiments, the content accessed via landing page 1024 on displays 1040 can be synchronized with the home content on display 1020. Thus, portability and mobility can be integrated with the fixed in home access illustrated in FIG. 11. It will be understood that the user experience may need to be adjusted, e.g., such things as Resolution, throughput, LBS etc.

Applications that can be available and that may be attractive for in car use can include turn by turn navigation that uses, e.g., a NIM like carrier Application, an application that allows viewing of pre-stored movies or downloading of new movies, television viewing, a music application, a web browser, games, picture viewing, etc. Accordingly, devices such as a navigation devices, DVD players, radios, etc., can be replaced by applications for the mobile environment that are accessed via landing page 1024 in the vehicle.

Figure 14:
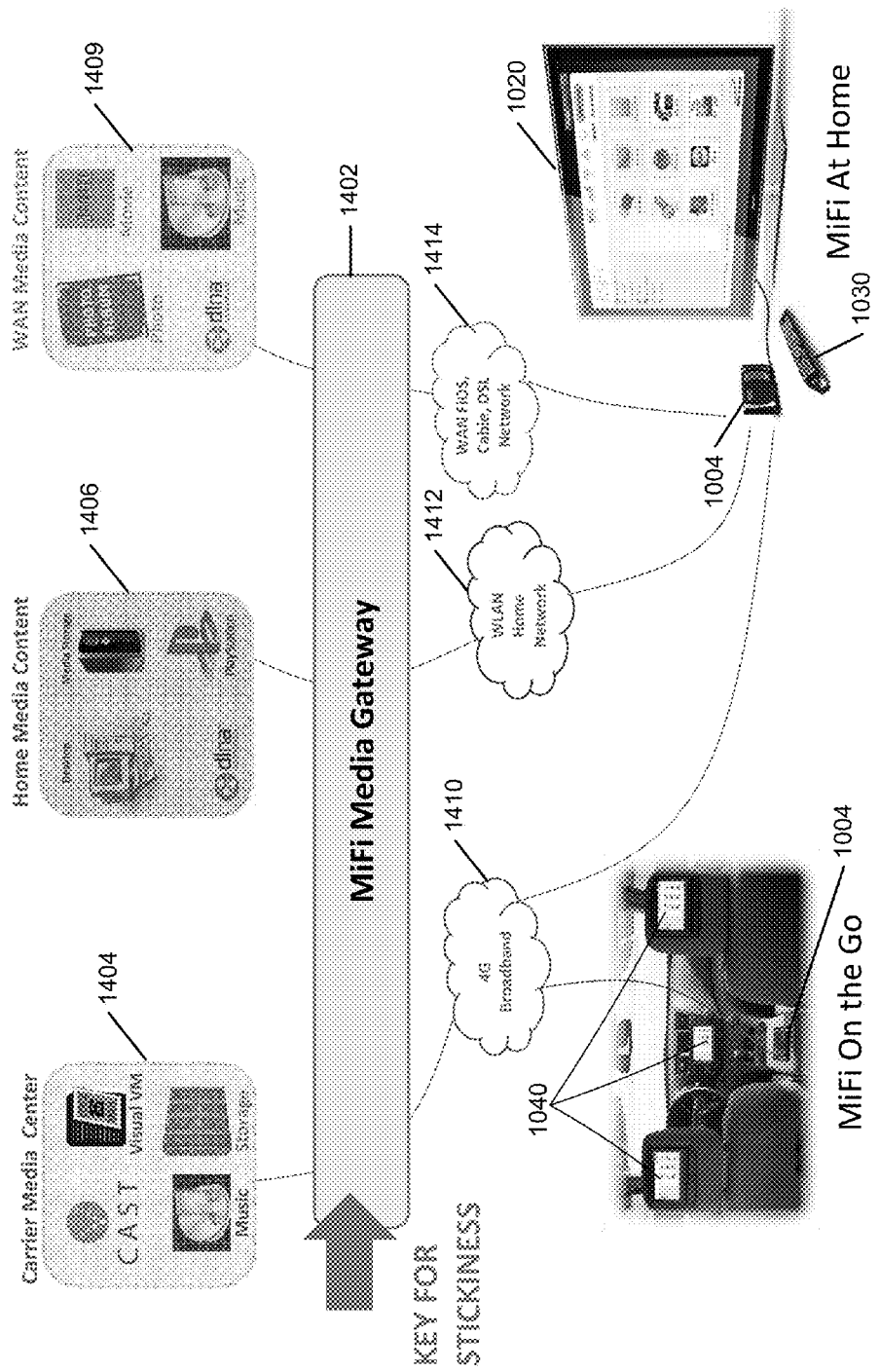
FIG. 14 is a diagram illustrating the types of content and network connections that can be available via the router of FIG. 10A or 10B.

IHMS 1004 can seamlessly connect to the 4G carrier network to allow access to the various content associated with the widgets and applications available in vehicle. When the user returns home, IMHS 1004 can be configured to automatically handoff from the WWAN, e.g., 4G network, to the in home network, e.g., WLAN. Thus, a seamless integration between mobile and fixed content access can be created as illustrated in FIG. 14. As can be seen, the mobile and fixed environments can be interfaced with a media gateway 1402 included in IMHS 1004. The media gateway 1402 can then be interfaced with various content sources via various networks, protocols an connection means 1410, 1412, and 114. The media gateway 1402 can then be interfaced with various content including carrier content 1404, home media content 1406, and other content 1408 access via the WAN 1414.

Thus, when IHMS 1004 is activated, e.g., via button 1012, it can automatically power up, detect whether an in-vehicle display 1040 or an in-home display, e.g., television 1020 is present, establish a connection therewith, then automatically push the landing page 1024 to the display, and automatically connect with either the WAN or the LAN. For example, if IMHS 1004 is in vehicle, then it can connect with the WAN after powering up in order to access various content. If it is in home, then it can connect with either the WAN or the LAN in order to access various content. In certain embodiments, IMHS 1004 can be configured to handoff from the WAN to the LAN as the device moves from the vehicle to the home and vise versa.

In certain embodiments, various peripheral devices can actually be replaced by the systems and methods illustrated above as illustrated in FIG. 13. In these embodiments, a peripheral device is complemented, or substituted for with an application or widget 1026. This allows for simplicity and ease of use; lower cost of acquisition; portability of the apps and services; intelligent determination of mobile vs. fixed environments; agents that allows for matching the service to the environment in terms of, e.g.: resolution (movie, photo), storage limits, throughput, etc. Thus, the IMHS can be capable of seamlessly connecting to a home network or a carrier network and capable of storing and processing content from either network and pushing to the display of a TV screen. The processing of the content depends on the type of network and the type of device connected to the IMHS. In certain embodiments, an intelligent agent capable of matching video resolution to content displayed and peripheral device in use can be included in IMHS 1004.

Figure 13:
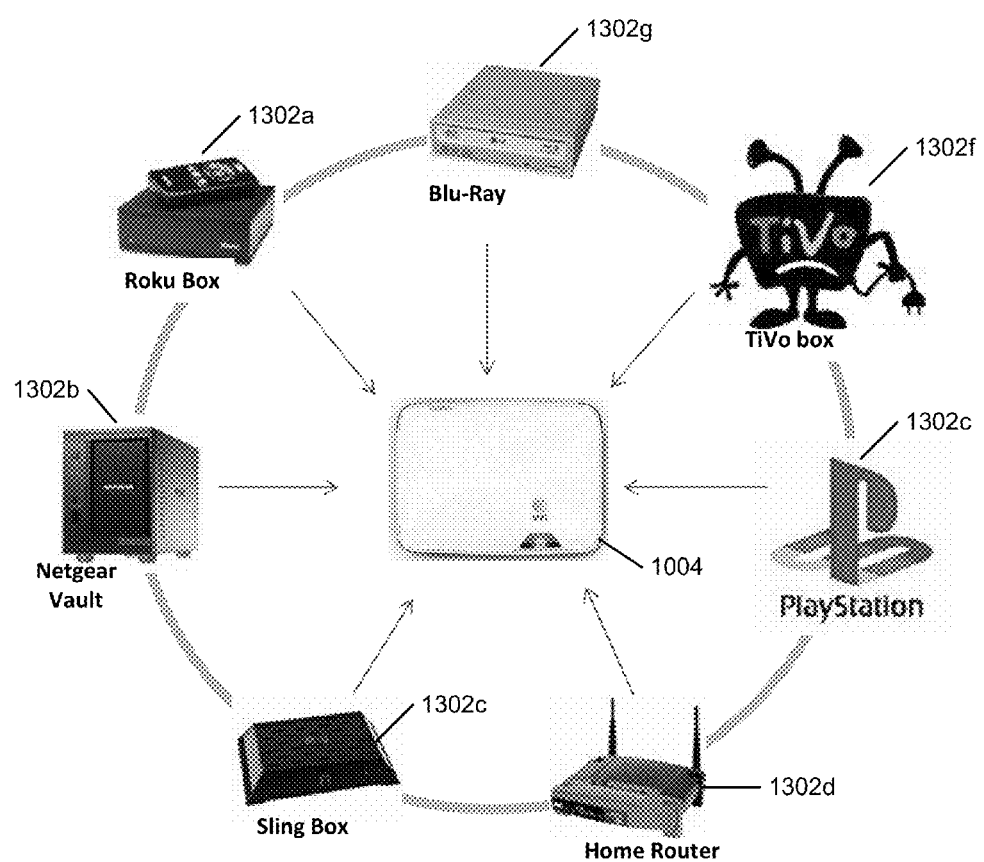
FIG. 13 is a diagram illustrating various peripheral devices that can be replaced by application running on the router of FIG. 10A or 10B.

FIG. 13 illustrated some of the devices that can be replaced by applications 1026 available via landing page 1024. Thus, many devices can be converged into one small, portable device. Again, or in addition to those shown in FIG. 13, these devices can include a remote control, router, camera, VCR, TV, music player, Internet, TiVo, video player, eBook reader, phone, navigator, picture frame, AD platform, etc. Such a peripheral device is simply replaced by an application with connection (1410-1414) to the associated content.

Figure 15:
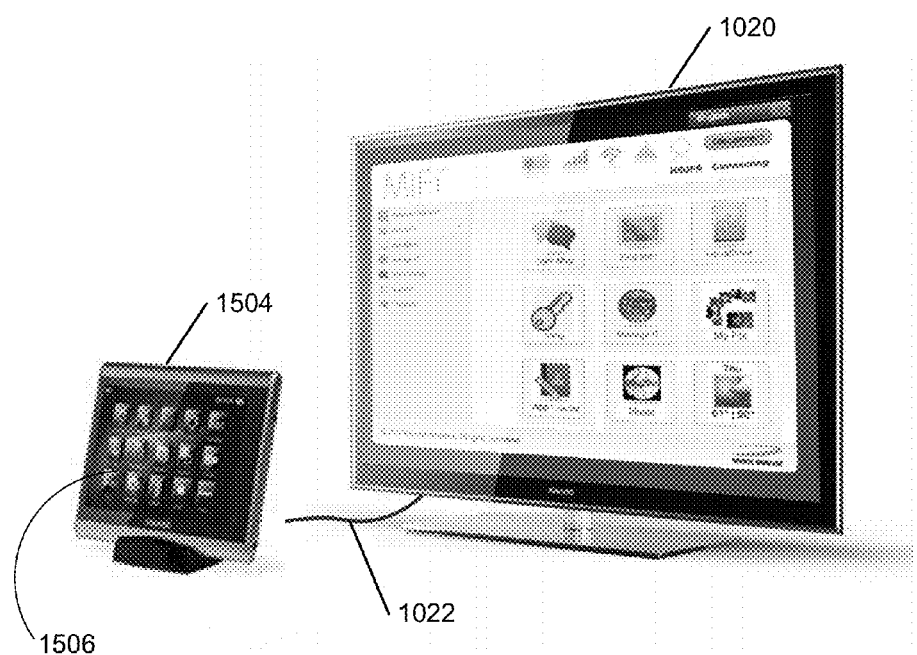
FIG. 15 is a diagram illustrating an example router configured to act as a media server in accordance with another embodiment.

In certain embodiments, a display can be added to the IMHS as illustrated in the example of FIG. 15. As can be seen, IMHS 1504 includes a display 1506. In this example, IMHS 1504 is connected via a wire or cable 1022 with television 1020. In addition to being able to display landing page 1024 on television 1020, now content and applications can also be displayed on IMHS 1504. This can allow the user to select content, such as a video on display 1506 and cause it to be instantly sent to television 1020 for display. It will be understood that the need for a remote can then be eliminated.

While IMHS 1504 is illustrated as being interfaced with television 1020 via a cable 1022, it will be understood that a wireless connection, such as a Infra red, WiFi, WAN, Wireless HDMI, UWB, or other wireless connection can be used. Moreover, button 1012, the activation of which can cause the landing page 1024 or content to be automatically displayed on display 1020 or display(s) 1040, can be replaced by a virtual button on display 1506.

While certain embodiments have been described above, it will be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings.

What is claimed is:

1. An Intelligent Mobile Hotspot (IMHS), comprising:
a local area network radio interface;
an in home display interface;
a user interface comprising one of a switch, button, or input;
a non-transitory memory configured to store instructions;
a processor coupled with memory, the instructions configured to cause the processor to perform the following in response to an activation of the switch, button or input:
automatically establish a data connection with a vehicle display over the local area network, and
automatically establish a data connection with a television over the in home display interface, and
automatically cause a landing page to be displayed on the in vehicle display or the television; and
a wide area network radio interface configured to enable communications between a wide area network and the IMHS, wherein the instructions further cause the processor to automatically establish a data connection with a base station associated with the wide area network over the wide area network when, in the case of the data connection with the base station not already being present, a data connection with a vehicle display or the in-home display is established.

2. The Intelligent Mobile Hotspot of claim 1, wherein the wide area network is a cellular type network.

3. The Intelligent Mobile Hotspot of claim 2, wherein the cellular network is a Worldwide Interoperability for Microwave Access (WiMAX), Universal Mobile Telecommunications System (UMTS), High-Speed Packet Access (HSPA), Evolved High-Speed Packet Access (HSPA+), long term evolution (LTE) or Discover-Offer-Request-Acknowledgement (DOrA) network.

4. The Intelligent Mobile Hotspot of claim 1, wherein the wide area data connection is a Point-to-Point (PPP) connection.

5. The Intelligent Mobile Hotspot of claim 1, wherein the landing page includes a plurality of applications that allow a user to access content when activated.

6. The Intelligent Mobile Hotspot of claim 1, wherein the content includes carrier content or local content.

7. The Intelligent Mobile Hotspot of claim 5, wherein the content includes at least one of visual voice mail and Short Message Service (SMS) messages; pictures in a photo album;

music, content stored in a Nova Drive™ or carrier cloud storage; home content; Vcast video clips; new carrier or other applications; and movies.

8. The Intelligent Mobile Hotspot of claim 5, wherein the instructions further cause the processor to access and process the content and display it on the television and vehicle display.

9. The Intelligent Mobile Hotspot of claim 1, wherein the instructions further cause the processor to determine what type of processing of the content is needed based on the network over which the content is accessed, the type of device the content is going to be displayed on, or both.

10. The Intelligent Mobile Hotspot of claim 1, wherein the processor is capable of matching video resolution for the content and for the type of display being used.

11. The Intelligent Mobile Hotspot of claim 1, wherein the local area network is a Wi-Fi network.

12. The Intelligent Mobile Hotspot of claim 1, wherein the local area network is a wireless Universal Serial Bus (USB) network or an Ultra-wideband network, or a Zigbee network.

13. The Intelligent Mobile Hotspot of claim 1, wherein the local area network data connection is a Transmission Control Protocol/Internet Protocol (TCP/IP) connection.

14. The Intelligent Mobile Hotspot of claim 1, wherein the instructions further cause the processor to automatically establish a data connection with a base station or router associated with the local area network over the local area network when a data connection with an in-home display is established.

15. The Intelligent Mobile Hotspot of claim 14, further comprising a wide area network radio interface configured to enable communications between a wide area network and the IMHS, and wherein the instructions further cause the processor to automatically establish a data connection with a base station associated with the wide area network over the wide area network when a data connection with a vehicle display is established.

16. The Intelligent Mobile Hotspot of claim 15, wherein the instructions further cause the processor to detect when the Intelligent Mobile Hotspot moves from a vehicle environment to a home environment, or vice versa, and to automatically cause a handoff to occur between the wide area network and the local area network.

17. The Intelligent Mobile Hotspot of claim 1, wherein the in home display interface comprises at least one of Infra-red, Wi-Fi, wide area network (WAN), Wireless High-Definition Multimedia Interface (HDMI), Ultra-wideband (UWB), cable, or other means of wireless communication.

18. The Intelligent Mobile Hotspot of claim 7, wherein the home content comprises content from at least one of any home PC, Blu-ray, Net gear storage Vault, Digital Living Network Alliance® (DLNA) server, and cloud content.

19. The Intelligent Mobile Hotspot of claim 1, wherein the cloud content comprises content from at least one of cable, Digital subscriber line (DSL), and Fiber Optic Service (FIOS).

\* \* \* \* \*